(No Model.)

E. M. PALMER.
RATCHET AND PAWL MECHANISM.

No. 321,523. Patented July 7, 1885.

Witnesses,
H. P. Williams
H. K. Woodbridge

Inventor;
Edgar M. Palmer
By Simonds & Burdett,
Attys.

UNITED STATES PATENT OFFICE.

EDGAR M. PALMER, OF HARTFORD, CONNECTICUT.

RATCHET-AND-PAWL MECHANISM.

SPECIFICATION forming part of Letters Patent No. 321,523, dated July 7, 1885.

Application filed June 1, 1885. (No model.)

*To all whom it may concern:*

Be it known that I, EDGAR M. PALMER, of Hartford, in the county of Hartford and State of Connecticut, have invented certain new and useful Improvements in Ratchet-Pawls, of which the following is a description, reference being had to the accompanying drawings, where—

Figure 1:
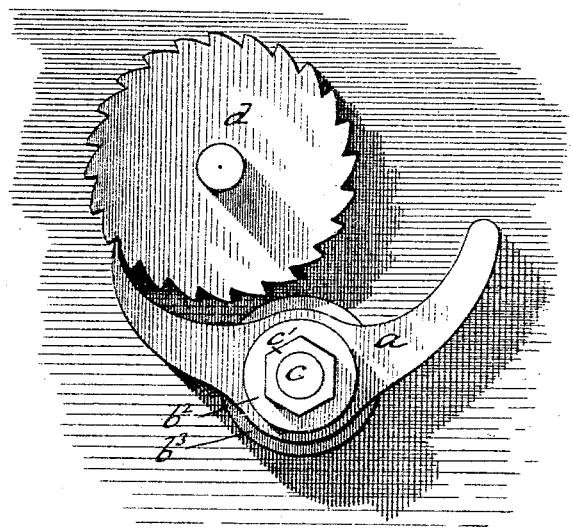
Figure 2:
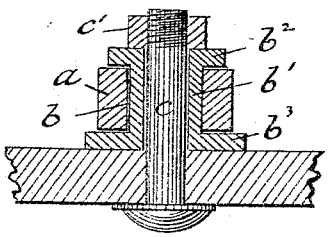

Figure 1 is a plan view of a ratchet-wheel and my improved pawl, showing their relative location. Fig. 2 is a sectional view through the pawl-socket on plane denoted by line $x$ $x$ of Fig. 1.

My invention relates particularly to the class of dogs or pawls in common use in connection with ratchet-wheels such as are used on car-brakes, winch-shafts, and the like. In the old forms of such devices the dog or pawl is usually pivotally connected to the structure by means of a bolt and nut, with either the head of the bolt or the nut resting directly upon one side of the pawl or upon a washer interposed between the end of the bolt or the nut and the pawl, with the result that the pawl becomes loose, so as to be in a short time rendered useless.

The object of my improvement is to remedy this and other faults in such old devices; and my invention consists in a dog or pawl having a pivot-socket, within which is permanently fixed a loose bushing with flanges which overhang the dog upon both sides and form a bearing for the nut or bolt-head, so that it is removed from contact with the dog, as more particularly hereinafter described.

In the accompanying drawings, where like letters of reference refer to like parts throughout, the letter $a$ denotes a dog or pawl of ordinary form, and preferably of metal cast to shape about the bushing $b$. The latter consists of a tubular barrel, $b'$, on both ends of which are formed, preferably by casting, the rigid flanges $b^2$ $b^3$, which project beyond the hole or socket through the dog so as to overhang the latter, substantially as illustrated in the drawings.

In order to form my device of cast-metal, the bushing is first cast to shape with the projecting flanges. It is then coated with a thin covering of suitable material to prevent the adhesion of the metal of the pawl, which is then, in a suitable mold, cast about the bushing.

Between the socket through the pawl and the adjacent parts of the bushing there is sufficient space to permit a free play of the pawl, which turns upon the bushing as a pivot.

In order to attach my improved device to any structure—such as the platform of a car—a bolt, $c$, is passed through a hole in the platform and through the hole in the bushing to hold the pawl in proper position to co-operate with the teeth of the ratchet-wheel $d$. The parts are held firmly in place by means of the nut $c'$, which is screwed firmly down upon the upper surface of the bushing, the projecting flange $b^2$ preventing it from coming in contact in any way with the dog. By this means the bushing may be as firmly bolted to the platform as is desired, with no chance of its being loosened by the swinging play of the pawl upon its pivot, and the lower flange of the bushing forms a washer, so as to lift the dog above the platform.

I claim as my improvement—

In combination with a pawl having a pivot-socket, the loose bushing located within said socket and having on both its ends the integral flanges which overhang the pawl, all substantially as described.

EDGAR M. PALMER.

Witnesses:
CHAS. L. BURDETT,
H. R. WILLIAMS.